(12) United States Patent
Shinagawa

(10) Patent No.: US 10,824,085 B2
(45) Date of Patent: Nov. 3, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazutaka Shinagawa, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/793,526

(22) Filed: Feb. 18, 2020

(65) Prior Publication Data

US 2020/0278619 A1    Sep. 3, 2020

(30) Foreign Application Priority Data

Feb. 28, 2019   (JP) .................................. 2019-036847

(51) Int. Cl.
   *G03G 15/01*   (2006.01)
   *G03G 15/08*   (2006.01)
   *H04N 1/60*    (2006.01)
   *H04N 1/29*    (2006.01)

(52) U.S. Cl.
   CPC ..... *G03G 15/0173* (2013.01); *G03G 15/0812* (2013.01); *H04N 1/295* (2013.01); *H04N 1/603* (2013.01); *H04N 1/6027* (2013.01)

(58) Field of Classification Search
   CPC ........... G03G 15/0173; G03G 15/0812; H04N 1/603; H04N 1/295; H04N 1/6027
   See application file for complete search history.

(56) References Cited

U.S. PATENT DOCUMENTS

2003/0118377 A1*   6/2003   Hirano ............... G03G 15/0812
                                                              399/284

FOREIGN PATENT DOCUMENTS

JP           2018054862 A      4/2018

* cited by examiner

*Primary Examiner* — Susan S Lee
(74) *Attorney, Agent, or Firm* — Canon U.S.A., Inc. IP Division

(57) ABSTRACT

A development bias to be applied onto a developing unit is reduced, in a case where it is determined that a remaining amount of toner is equal to or less than a threshold, in a mode in which a rotation speed of a developing unit is faster than a rotation speed of an image bearing member to increase an amount of toner to be supplied to the image bearing member.

8 Claims, 11 Drawing Sheets

| COLOR CONVERSION TABLE A |||||||
|---|---|---|---|---|---|---|
| INPUT VALUE ||| OUTPUT VALUE ||||
| R | G | B | C | M | Y | K |
| 0 | 0 | 0 | 98 | 78 | 118 | 255 |
| 0 | 0 | 17 | 114 | 96 | 110 | 222 |
| 0 | 0 | 34 | 128 | 113 | 102 | 192 |
| 0 | 0 | 51 | 143 | 129 | 94 | 163 |
| 0 | 0 | 68 | 156 | 144 | 87 | 137 |
| 0 | 0 | 85 | 168 | 158 | 79 | 113 |
| 0 | 0 | 102 | 180 | 171 | 71 | 92 |
| 0 | 0 | 119 | 191 | 184 | 63 | 73 |
| 0 | 0 | 136 | 200 | 195 | 55 | 56 |
| 0 | 0 | 153 | 209 | 205 | 47 | 41 |
| 0 | 0 | 170 | 217 | 214 | 39 | 28 |
| 0 | 0 | 187 | 224 | 222 | 31 | 18 |
| 0 | 0 | 204 | 230 | 229 | 24 | 10 |
| 0 | 0 | 221 | 234 | 234 | 16 | 5 |
| 0 | 0 | 238 | 238 | 237 | 8 | 1 |
| 0 | 0 | 255 | 255 | 255 | 0 | 0 |
| 0 | 0 | 0 | 98 | 78 | 118 | 255 |
| 0 | 0 | 17 | 114 | 96 | 110 | 222 |
| 0 | 0 | 34 | 128 | 113 | 102 | 192 |
| ⋮ | ⋮ | ⋮ | ⋮ | ⋮ | ⋮ | ⋮ |
| 255 | 0 | 0 | 0 | 255 | 255 | 0 |
| ⋮ | ⋮ | ⋮ | ⋮ | ⋮ | ⋮ | ⋮ |
| 255 | 136 | 0 | 0 | 111 | 247 | 0 |
| 255 | 136 | 17 | 0 | 111 | 230 | 0 |
| 255 | 136 | 34 | 0 | 110 | 212 | 0 |
| 255 | 136 | 51 | 0 | 110 | 195 | 0 |
| 255 | 136 | 68 | 0 | 110 | 178 | 0 |
| 255 | 136 | 85 | 0 | 110 | 161 | 0 |
| 255 | 136 | 102 | 0 | 110 | 144 | 0 |
| 255 | 136 | 119 | 0 | 110 | 127 | 0 |
| 255 | 136 | 136 | 0 | 111 | 111 | 0 |
| 255 | 136 | 153 | 0 | 112 | 95 | 0 |
| 255 | 136 | 170 | 0 | 113 | 79 | 0 |
| ⋮ | ⋮ | ⋮ | ⋮ | ⋮ | ⋮ | ⋮ |
| 255 | 255 | 170 | 0 | 0 | 85 | 0 |
| 255 | 255 | 187 | 0 | 0 | 68 | 0 |
| 255 | 255 | 204 | 0 | 0 | 51 | 0 |
| 255 | 255 | 221 | 0 | 0 | 34 | 0 |
| 255 | 255 | 238 | 0 | 0 | 17 | 0 |
| 255 | 255 | 255 | 0 | 0 | 0 | 0 |

| COLOR CONVERSION TABLE B ||||||| 
| INPUT VALUE ||| OUTPUT VALUE ||||
| R | G | B | C | M | Y | K |
|---|---|---|---|---|---|---|
| 0 | 0 | 0 | 93 | 74 | 111 | 255 |
| 0 | 0 | 17 | 108 | 91 | 104 | 210 |
| 0 | 0 | 34 | 121 | 107 | 96 | 182 |
| 0 | 0 | 51 | 136 | 122 | 89 | 154 |
| 0 | 0 | 68 | 148 | 137 | 82 | 129 |
| 0 | 0 | 85 | 159 | 150 | 74 | 107 |
| 0 | 0 | 102 | 171 | 162 | 67 | 87 |
| 0 | 0 | 119 | 181 | 175 | 59 | 69 |
| 0 | 0 | 136 | 190 | 185 | 52 | 53 |
| 0 | 0 | 153 | 198 | 195 | 44 | 38 |
| 0 | 0 | 170 | 206 | 203 | 36 | 26 |
| 0 | 0 | 187 | 213 | 211 | 29 | 17 |
| 0 | 0 | 204 | 218 | 217 | 22 | 9 |
| 0 | 0 | 221 | 224 | 224 | 15 | 4 |
| 0 | 0 | 238 | 230 | 228 | 7 | 0 |
| 0 | 0 | 255 | 255 | 255 | 0 | 0 |
| 0 | 0 | 0 | 93 | 74 | 111 | 255 |
| 0 | 0 | 17 | 108 | 91 | 104 | 210 |
| 0 | 0 | 34 | 121 | 107 | 96 | 182 |
| ⋮ | ⋮ | ⋮ | ⋮ | ⋮ | ⋮ | ⋮ |
| 255 | 0 | 0 | 0 | 255 | 255 | 0 |
| ⋮ | ⋮ | ⋮ | ⋮ | ⋮ | ⋮ | ⋮ |
| 255 | 136 | 0 | 0 | 105 | 243 | 0 |
| 255 | 136 | 17 | 0 | 105 | 218 | 0 |
| 255 | 136 | 34 | 0 | 104 | 200 | 0 |
| 255 | 136 | 51 | 0 | 104 | 184 | 0 |
| 255 | 136 | 68 | 0 | 104 | 168 | 0 |
| 255 | 136 | 85 | 0 | 104 | 152 | 0 |
| 255 | 136 | 102 | 0 | 104 | 136 | 0 |
| 255 | 136 | 119 | 0 | 104 | 120 | 0 |
| 255 | 136 | 136 | 0 | 105 | 105 | 0 |
| 255 | 136 | 153 | 0 | 106 | 90 | 0 |
| 255 | 136 | 170 | 0 | 107 | 74 | 0 |
| ⋮ | ⋮ | ⋮ | ⋮ | ⋮ | ⋮ | ⋮ |
| 255 | 255 | 170 | 0 | 0 | 80 | 0 |
| 255 | 255 | 187 | 0 | 0 | 64 | 0 |
| 255 | 255 | 204 | 0 | 0 | 48 | 0 |
| 255 | 255 | 221 | 0 | 0 | 32 | 0 |
| 255 | 255 | 238 | 0 | 0 | 16 | 0 |
| 255 | 255 | 255 | 0 | 0 | 0 | 0 |

| COLOR CONVERSION TABLE C ||||||| 
|---|---|---|---|---|---|---|
| INPUT VALUE ||| OUTPUT VALUE ||||
| R | G | B | C | M | Y | K |
| 0 | 0 | 0 | 89 | 70 | 106 | 255 |
| 0 | 0 | 17 | 103 | 87 | 99 | 200 |
| 0 | 0 | 34 | 116 | 102 | 92 | 173 |
| 0 | 0 | 51 | 129 | 117 | 84 | 147 |
| 0 | 0 | 68 | 141 | 130 | 78 | 123 |
| 0 | 0 | 85 | 152 | 143 | 71 | 101 |
| 0 | 0 | 102 | 163 | 155 | 64 | 83 |
| 0 | 0 | 119 | 173 | 167 | 56 | 65 |
| 0 | 0 | 136 | 181 | 177 | 49 | 50 |
| 0 | 0 | 153 | 189 | 186 | 42 | 36 |
| 0 | 0 | 170 | 197 | 194 | 35 | 25 |
| 0 | 0 | 187 | 203 | 201 | 27 | 16 |
| 0 | 0 | 204 | 209 | 208 | 21 | 9 |
| 0 | 0 | 221 | 216 | 216 | 14 | 4 |
| 0 | 0 | 238 | 224 | 222 | 7 | 0 |
| 0 | 0 | 255 | 255 | 255 | 0 | 0 |
| 0 | 0 | 0 | 89 | 70 | 106 | 255 |
| 0 | 0 | 17 | 103 | 87 | 99 | 200 |
| 0 | 0 | 34 | 116 | 102 | 92 | 173 |
| ⋮ | ⋮ | ⋮ | ⋮ | ⋮ | ⋮ | ⋮ |
| 255 | 0 | 0 | 0 | 255 | 255 | 0 |
| ⋮ | ⋮ | ⋮ | ⋮ | ⋮ | ⋮ | ⋮ |
| 255 | 136 | 0 | 0 | 100 | 240 | 0 |
| 255 | 136 | 17 | 0 | 100 | 207 | 0 |
| 255 | 136 | 34 | 0 | 99 | 191 | 0 |
| 255 | 136 | 51 | 0 | 99 | 175 | 0 |
| 255 | 136 | 68 | 0 | 99 | 160 | 0 |
| 255 | 136 | 85 | 0 | 99 | 145 | 0 |
| 255 | 136 | 102 | 0 | 99 | 129 | 0 |
| 255 | 136 | 119 | 0 | 99 | 114 | 0 |
| 255 | 136 | 136 | 0 | 100 | 100 | 0 |
| 255 | 136 | 153 | 0 | 101 | 85 | 0 |
| 255 | 136 | 170 | 0 | 102 | 71 | 0 |
| ⋮ | ⋮ | ⋮ | ⋮ | ⋮ | ⋮ | ⋮ |
| 255 | 255 | 170 | 0 | 0 | 76 | 0 |
| 255 | 255 | 187 | 0 | 0 | 61 | 0 |
| 255 | 255 | 204 | 0 | 0 | 46 | 0 |
| 255 | 255 | 221 | 0 | 0 | 30 | 0 |
| 255 | 255 | 238 | 0 | 0 | 15 | 0 |
| 255 | 255 | 255 | 0 | 0 | 0 | 0 |

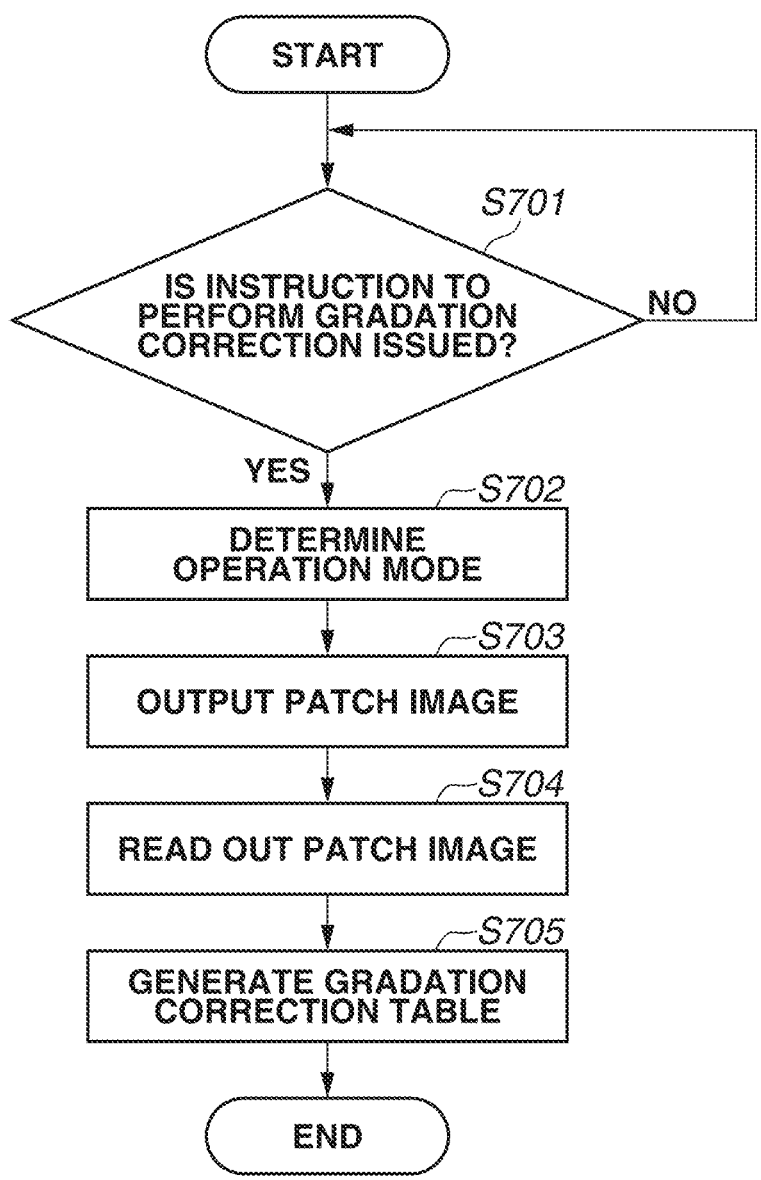

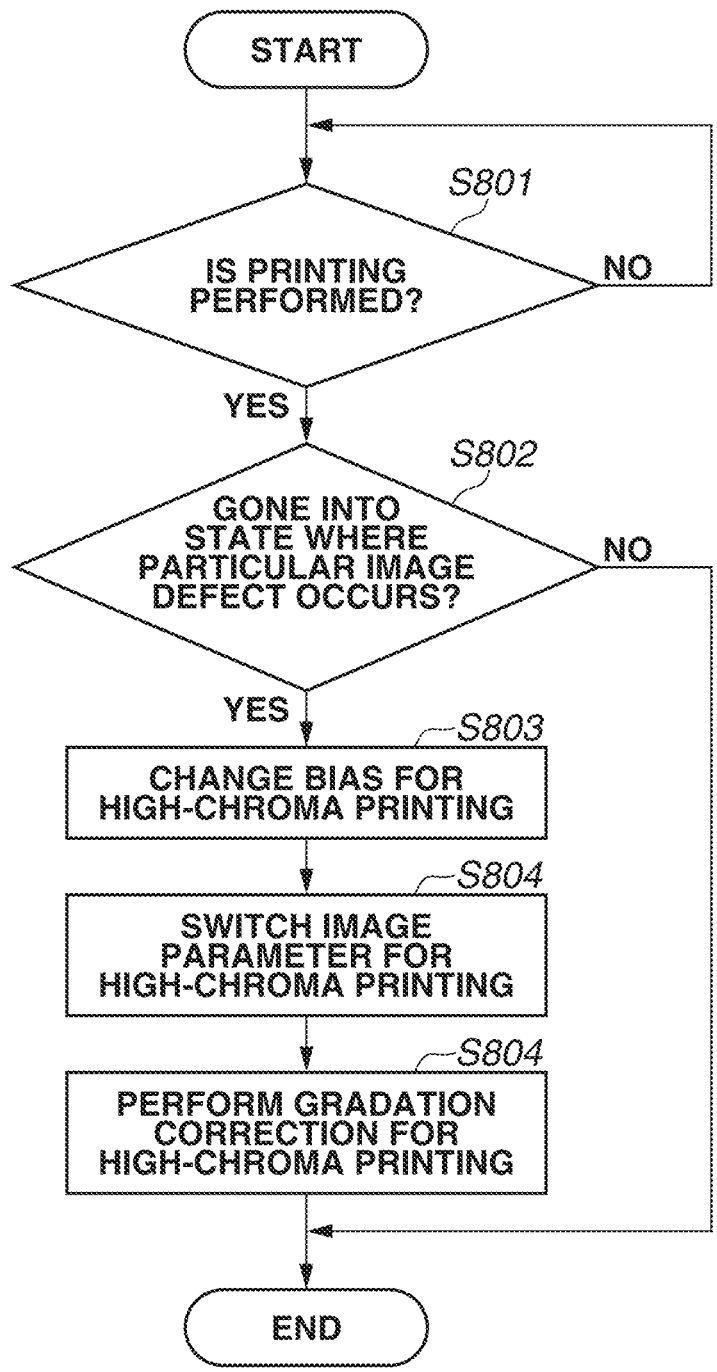

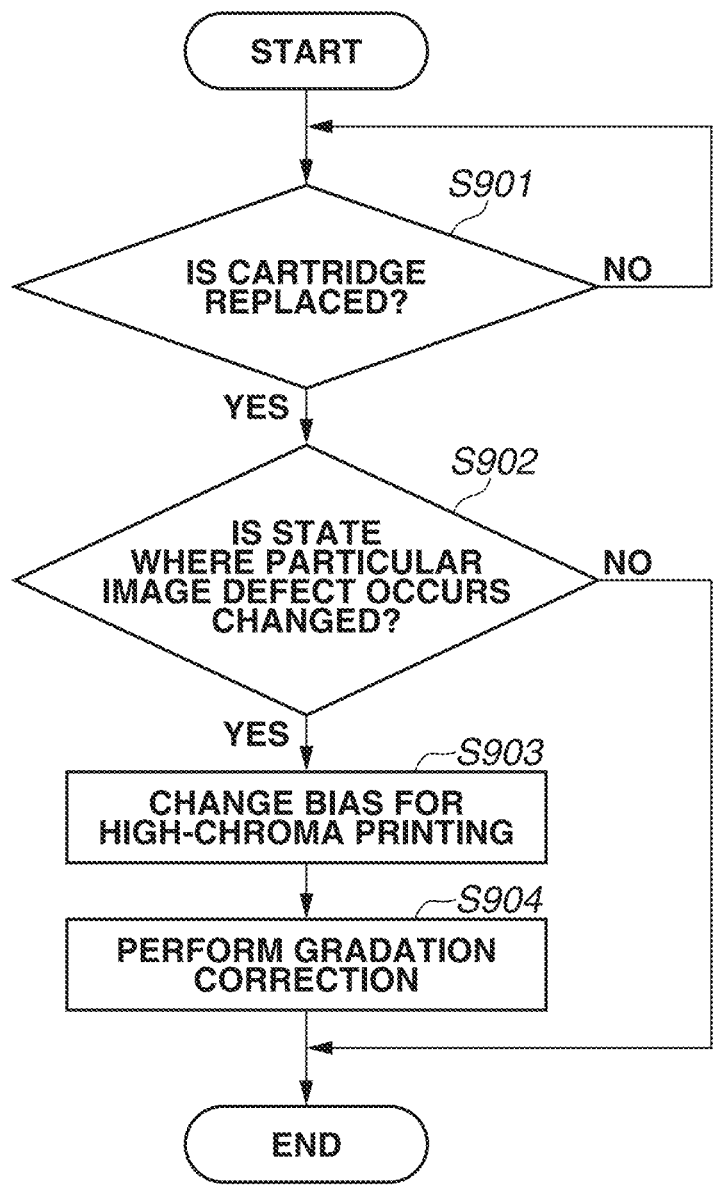

IMAGE PROCESSING APPARATUS, IMAGE PROCESSING METHOD, AND STORAGE MEDIUM

BACKGROUND OF THE DISCLOSURE

Field of the Disclosure

The present disclosure relates to an image forming apparatus, an image forming method, and a storage medium.

Description of the Related Art

An electrophotographic image forming apparatus is configured to perform recording by forming an electrostatic latent image on a photosensitive drum, attaching toner to the photosensitive drum by using a developing unit thereby to develop the electrostatic latent image as a toner image, and transferring the toner image onto a recording sheet. For this kind of image forming apparatus, Japanese Patent Application Laid-Open No. 2018-054862 has discussed a method of setting a circumferential velocity ratio of the developing roller with respect to the photosensitive drum to be variable, increasing an amount of toner to be supplied to the photosensitive drum, performing appropriate color adjustment with switchable color conversion coefficients, and increasing a color density of an output image for improving the chroma of an image. Printing adopting the method for improving the chroma of images is referred to as high-chroma printing. Such high-chroma printing requires higher biases for developing and the like in order to increase the color densities of the output image.

Compared with ordinary printing, in high-chroma printing, a circumferential velocity ratio of a developing roller with respect to a photosensitive drum is increased so that an amount of toner to be supplied is increased and a bias is also increased. As a result, a remaining life of toner cartridges is decreased and consequently the toner is deteriorated over time, thereby the toner may be retained between the photosensitive drum and the developing roller. If the toner is retained, striped image may be generated when an image of a large area with a higher color density is to be printed.

SUMMARY OF THE DISCLOSURE

An image forming apparatus according to an aspect of the present disclosure is configured to record an image by forming an electrostatic latent image on an image bearing member, developing the electrostatic latent image by attaching toner onto the image bearing member by using a developing unit so as to form a toner image, and transferring the toner image onto a recording sheet from the image bearing member. The image forming apparatus includes a setting unit configured to set a mode in which a rotation speed of the developing unit is faster than a rotation speed of the image bearing member to increase an amount of toner to be supplied to the image bearing member, a determining unit configured to determine whether or not a remaining amount of toner is equal to or less than a threshold in the mode set by the setting unit, and a bias changing unit configured to reduce a development bias to be applied onto the developing unit in a case where the determining unit determines that the remaining amount of the toner is equal to or less than the threshold.

An image forming apparatus according to another aspect of the present disclosure is configured to record an image by forming an electrostatic latent image on an image bearing member, developing the electrostatic latent image by attaching toner onto the image bearing member by using a developing unit so as to form a toner image, and transferring the toner image onto a recording sheet from the image bearing member. The image forming apparatus includes a setting unit configured to set a mode in which a rotation speed of the developing unit is faster than a rotation speed of the image bearing member to increase an amount of toner to be supplied to the image bearing member, a determining unit configured to determine a remaining life of the developing unit or a remaining life of the image bearing member in the mode set by the setting unit, and a bias changing unit configured to reduce a development bias to be applied onto the developing unit based on a result of determination by the determining unit.

Further features and aspects of the present disclosure will become apparent from the following description of example embodiments with reference to the attached drawings.

BRIEF DESCRIPTION OF THE DRAWINGS

FIGS. 6A to 6C illustrate color conversion tables according to the example embodiment.

FIG. 7 is a flowchart illustrating a gradation correction table generating procedure according to the example embodiment.

FIG. 8 is a flow chart illustrating a process switching procedure for switching to high-chroma printing when performing printing according to the example embodiment.

FIG. 9 is a flowchart illustrating a process switching procedure for switching to high-chroma printing when performing cartridge replacement according to an example embodiment.

DESCRIPTION OF THE EMBODIMENTS

Embodiments of the present disclosure will be described below, with reference to the attached drawings. It should be noted that the example embodiments are not intended to limit the disclosure recited in claims thereto, and all the features combined in the explanation of the example embodiments are not necessarily essential for the inventions recited in the claims.

The present disclosure is applicable to electrophotographic image forming apparatuses such as copying machines, multifunction machines, laser printers (that is, single function peripherals, hereinafter, referred to as SFPs), and facsimiles, regardless of mono-color type or multi-color type. In a first example embodiment described below, an SFP is to be explained as an example of such an image forming apparatus to which the present disclosure is applied. The SFP to be explained below as an example is one capable of forming a multicolor image on a recording material by using developing agents (toners) of a plurality of colors (herein, four colors of cyan, magenta, yellow, and black (CMYK)).

<Overview of Example Image Forming Apparatus>

Figure 1:
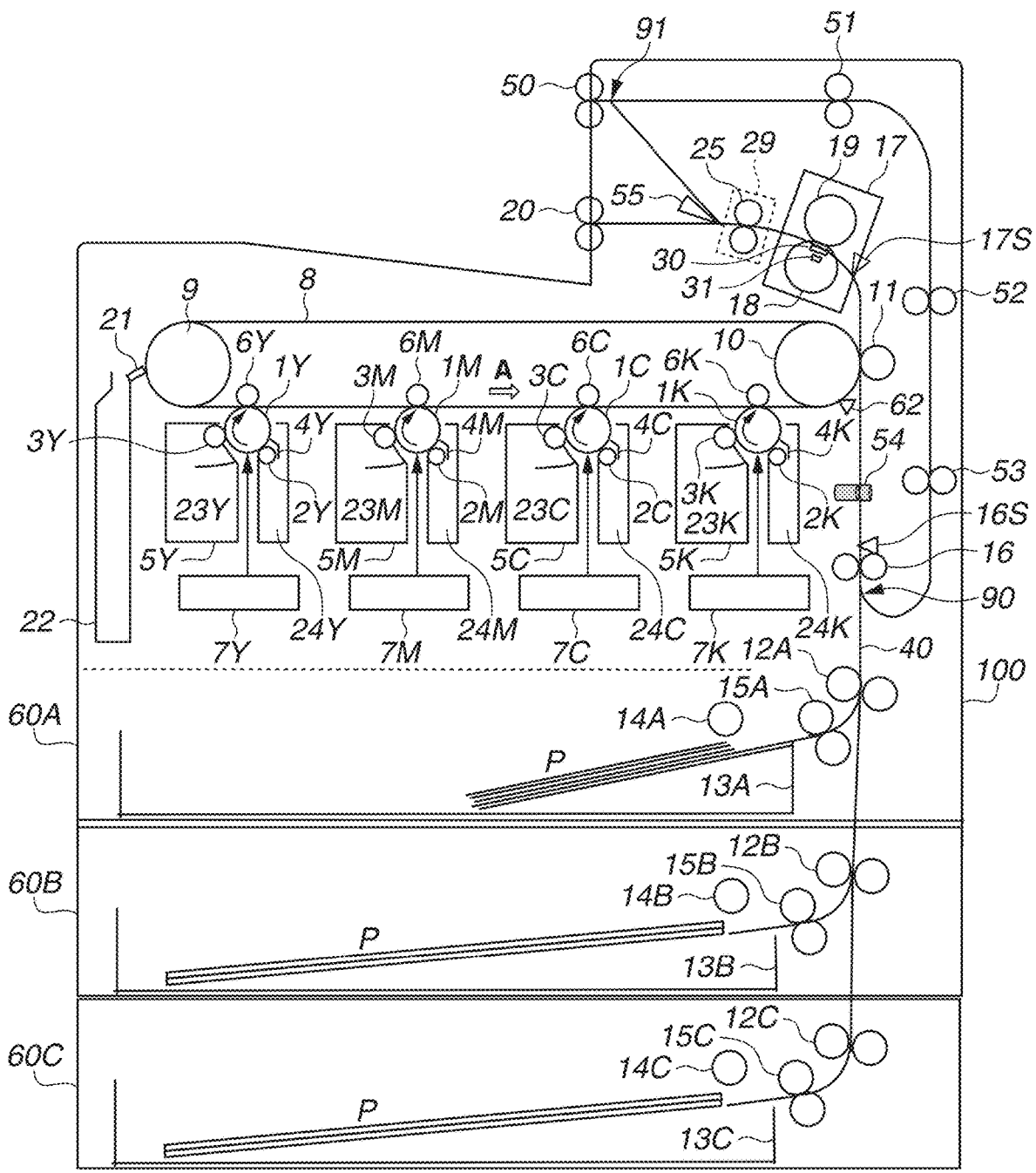
FIG. 1 is a schematic view illustrating an image forming apparatus according to an example embodiment.

An overall configuration of the color electrophotographic image forming apparatus will be schematically described below, with reference to FIG. 1. An image forming apparatus exemplified in the first example embodiment is a laser printer utilizing an electrophotographic image forming process. The color printer illustrated in FIG. 1 corresponds to an image forming apparatus 100 provided with four process stations 5Y, 5M, 5C, and 5K detachably attached thereto. The four process stations 5Y, 5M, 5C, and 5K are identical with each other in terms of structure, but different from each other in that the four process stations 5Y, 5M, 5C, and 5K are used to form an image with a toner (a developing agent) of a different color, that is, yellow (Y), magenta (M), cyan (C), or black (K), respectively. In the following description, the process stations will be referred to without the reference symbols YMCK, except when a particular process station is to be described. Each process station 5 includes a toner container 23, a photosensitive drum 1 (image bearing member), which is a photosensitive member, a charging roller 2, a developing roller 3 (developing unit), a cleaning blade 4 (photosensitive member cleaning unit), and a collection toner container 24. An exposure device 7 is provided below the process stations (process cartridges) 5 and exposes the photosensitive drum 1 to light based on an image signal.

The photosensitive drum 1 is uniformly electrically charged to a predetermined potential of a predetermined polarity by the charging roller 2 while the photosensitive drum 1 is rotated. The exposure device 7 performs image-exposure on the photosensitive drum 1 so that electrostatic latent images corresponding to first to fourth color component images (yellow, magenta, cyan, or black component image) are formed on the photosensitive drum 1. The charging roller 2 is configured to rotate following the rotation of the photosensitive drum 1. The exposure device 7 used in the present example embodiment is a polygon scanner provided with a laser diode and configured to form an image on the photosensitive drum 1 by radiating a laser beam modulated based on image information to the photosensitive drum 1, thereby forming an electrostatic latent image on the photosensitive drum 1. Writing of the laser beam scanning is performed in such a manner that the scanning starts for each scanning line after a predetermined time from reception of a position signal (BD signal) for the scanning line in the polygon scanner, in a main scanning direction (a direction vertical to a sheet conveying direction). Writing is performed with predetermined intervals between process stations in a sub scanning direction (the sheet conveying direction) when the image is being formed on the sheet. In this way, the exposure is performed in such a manner that identical positions on the photosensitive drums 1 are surely exposed in the first and fourth process stations Y, M, C, and K, so that color misalignment can be prevented. The electrostatic latent images formed on the photosensitive drums 1 are developed by the developing rollers 3 of the first and fourth process stations Y, M. C, and K. The developing rollers 3 attach the toners of respective colors onto the electrostatic latent images on the photosensitive drums 1. The toner of each developing unit is a negatively-charged non-magnetic monocomponent toner, and the electrostatic latent image is developed by contact-type non-magnetic monocomponent development. A development bias is applied onto the developing rollers 3 by a development bias power source (not illustrated), so that the electrostatic latent images are developed. When the high-chroma printing is to be performed, a circumferential velocity ratio between the developing rollers 3 and the photosensitive drums 1 is increased (the developing rollers 3 are rotated faster than the photosensitive drums 1) so that an amount of toner to be supplied can be increased. A toner application amount can be increased by increasing the development bias and a charging bias since a large amount of toner is to be supplied.

An intermediate transfer belt unit includes an intermediate transfer belt 8, a driving roller 9, and secondary transfer counter rollers 10. Primary transfer rollers 6 are provided within a loop of the intermediate transfer belt 8 in such a way that each of the primary transfer rollers 6 faces corresponding one of the photosensitive drums 1. The primary transfer rollers 6 are configured to apply a primary transfer positive bias from a primary transfer bias power source (not illustrated). The driving roller 9 is rotated by a motor (not illustrated), so that the intermediate transfer belt 8 is rotated and then the secondary transfer counter rollers 10 is rotated. While the photosensitive drums 1 are rotated in an arrow direction and the intermediate transfer belt 8 is rotated in Arrow A direction, the primary transfer positive bias is applied onto the primary transfer rollers 6. As a result, the toner images on the photosensitive drums 1 are primarily transferred onto the intermediate transfer belt 8 (on the belt) sequentially in the order starting from the toner image on the photosensitive drum 1Y. After that, the toner images of four colors thus overlapped are transferred onto the secondary transfer roller 11. A density sensor 62 detects a toner density of the toner images of four colors thus primarily transferred on the intermediate transfer belt 8.

The cleaning blades 4 provided for the photosensitive drums 1 are in contact with the respective photosensitive drums 1, to remove residual toner that has not been transferred onto the intermediate transfer belt 8 but has remained on surfaces of the photosensitive drums 1, and other residues on the photosensitive drums 1 (photosensitive members). A part of a visible image (toner image) is not transferred onto a sheet P at the position where the secondary transfer roller 11 is located but remains on the intermediate transfer belt 8. The visible image remaining on the intermediate transfer belt 8 is unnecessary, and thus is cleaned off by cleaning operation. In the cleaning operation, the intermediate transfer belt 8 conveys the unnecessary visible image to a cleaning blade 21, and the visible image is scraped off with the cleaning blade 21. Then, the toner is collected into a collection toner container 24, so that the visible image is to be removed.

Sheets P are stored in feeding cassettes (13A, 13B, and 13C) of paper feeding units (60A, 60B, and 60C). A sheet P is conveyed to the secondary transfer roller 11 by a pick-up roller (14A, 14B, or 14C), a paper feeding roller (15A, 15B, or 15C), a pair of pulling rollers (12A, 12B, or 12C), and a pair of resist rollers 16. Here, the paper feeding unit 60A is a standard feeder integrated with the image forming apparatus 100, while the paper feeding units 60B and 60C are optional feeders, which are detachably attached and provided as needed.

In the transfer of the toner image from the intermediate transfer belt 8 to the sheet P, the positive bias is applied onto the secondary transfer roller 11, so that the toner images of four colors, which are on the intermediate transfer belt 8, are transferred onto the sheet P thus conveyed (hereinafter, this transfer is referred to as secondary transfer).

A paper type discrimination sensor 54 is provided at a position downstream of the pair of resist rollers 16, where conveyance paths from paper feeding inlets merge together. In a case where the paper type discrimination sensor 54 discriminates a type of the sheet P thus fed, a paper feeding motor (not illustrated) is stopped from timing when a resist sensor 16S detects a front edge of the sheet P to timing when the front edge of the sheet P surely reaches the position where the paper type discrimination sensor 54 is located. After the paper feeding motor is stopped, the paper type discrimination sensor 54 identifies the type of the sheet P.

The sheet P with the toner image transferred thereon is conveyed to a fixing unit 17. The fixing unit 17 is a film heating type fixing unit, which includes a fixing roller 18 including therein a fixing heater 30 and a fixing thermistor 31 configured to measure a temperature of the fixing heater 30, and a pressing roller 19 configured to be pressed against the fixing roller 18. The toner image is fixed on the sheet P by heating and pressing the sheet P. The sheet P with the toner image fixed thereon is conveyed by a pair of curling correction rollers 25 of a curling correction mechanism 29, and then discharged out of the image forming apparatus 100 (out of the machine) as an article with an image formed thereon (such as a printed sheet).

In a case where a second side of the sheet P having passed the fixing unit 17 is to be printed instead of the sheet P being discharged out of the machine, the sheet P having passed a position where the fixing unit 17 is located is conveyed to a reversing point 91. A two-side printing switching flapper 55 is configured to switch the sheet conveying direction between a direction in which the sheet P is to be discharged and a direction to a reversing unit, and in a case where two-side printing is to be performed, the two-side printing switching flapper 55 switches the sheet conveying direction to the direction to the reversing unit before the front edge of the sheet P with the image formed on a first side thereof reaches a position where the two-side printing switching flapper 55 is located. After the sheet P passes the reversing point 91, a pair of reversing rollers 50 conveys the sheet P in the direction in which the sheet P is to be discharged, and the pair of reversing rollers 50 is stopped temporally while the sheet P is still in the nip between the pair of reversing rollers 50 after a rear end of the sheet P has passed the reversing point 91. The pair of reversing rollers 50 are rotated in a rotation direction reverse to the rotation direction in which the pair of reversing rollers 50 have been rotated so far, so that the sheet P is conveyed in a two-side printing conveyance path direction. The sheet P is conveyed by a pair of first two-side printing conveyance rollers 51, a pair of second two-side printing conveyance rollers 52, and a pair of third two-side printing conveyance rollers 53 in the two-side printing conveyance path. The two-side printing conveyance path merges with the conveyance path between the pair of paper feeding rollers 15 and the pair of resist rollers 16 at a merging point 90. The pair of resist rollers 16 conveys the sheet P thus reversed to the secondary transfer roller 11. Toner images of four colors are transferred onto the second side of the sheet P from the intermediate transfer belt 8. The toner images thus transferred onto the second side are fixed by the fixing unit 17. The two-side printing switching flapper 55 switches the sheet conveying direction to the direction in which the sheet P is to be discharged, so that the sheet P with images formed on both the sides thereof is discharged out of the machine.

<Example Hardware Configuration of Image Forming Apparatus>

Figure 2:
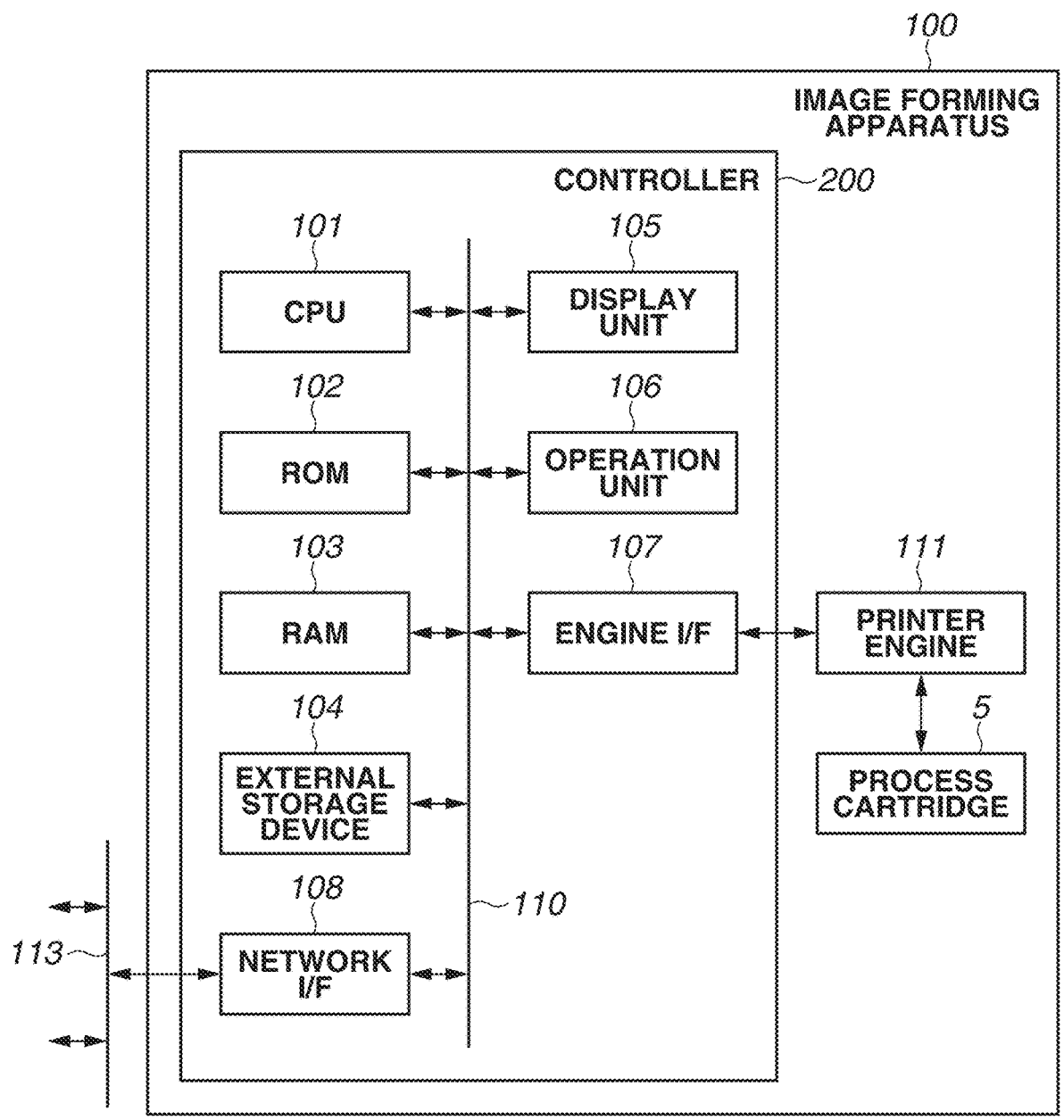
FIG. 2 is a block diagram illustrating a system configuration of the image forming apparatus according to the example embodiment.

FIG. 2 is a block diagram illustrating a hardware configuration of the image forming apparatus 100 according to the first example embodiment. The image forming apparatus 100 includes a controller 200 provided with a central processing unit (CPU) 101, a read-only memory (ROM) 102, a random access memory (RAM) 103, an external storage device 104, a display unit 105, an operation unit 106, an engine interface (I/F) 107, and a network interface (I/F) 108. The units of the controller 200 are interconnected via a system bus 110. A printer engine 111 is connected to the system bus 110 via the engine I/F 107. The process cartridges 5 are accessible via the engine I/F 107 and the printer engine 111.

The CPU 101 is configured to control operations of the whole image forming apparatus 100. The CPU 101 is configured to read a program stored in the ROM 102 into the RAM 103 and to execute the program, thereby performing various processes described below. The ROM 102 is a read-only memory, and stores a system boot program, a program for controlling the printer engine, character data, character code information, and the like. The RAM 103 is a volatile random access memory and is used as a work area of the CPU 101, and as a temporary storage area for various data. For example, the RAM 103 is used as a storage area for storing font data additionally registered by downloading, an image file received from an external apparatus, or the like. The external storage device 104 includes, for example, a hard disk, and is used to spool various data, and for storing programs, information files, image data, or as a work area.

The display unit 105 includes, for example, a liquid crystal display (LCD) device, and is used to display setting conditions, a status of a process in execution, error situations, etc., of the image forming apparatus 100. The operation unit 106 includes an input device such as hard keys, or a touch screen provided on the display unit 105, and is configured to receive an input (instruction) by user's operation. The operation unit 106 is used for changing the settings of the image forming apparatus 100, resetting the settings, or the like, and is used to set an operation mode (printing mode) of the image forming apparatus 100 when image formation (printing) is to be performed.

The engine I/F 107 functions as an interface for controlling the printer engine 111 in response to instructions from the CPU 101 when printing is to be performed. The CPU 101 and the printer engine 111 transmits and receives engine control commands, and the like, via the engine I/F 107. The CPU 101 is capable of accessing the process cartridges 5 via the engine I/F 107 and the printer engine 111. The network I/F 108 functions as an interface for connecting the image forming apparatus 100 with a network 113. The network 113 may be, for example, a local area network (LAN) or a public switched telephone network (PSTN). The network 113 is also connected with a personal computer (PC) (not illustrated), from which image data is transmitted to the image forming apparatus 100 so that printing is to be performed. In this case, it is assumed that the network 113 is connected with a PC, but a device connected to the network 113 is not limited to the PC but may be another type of information processing terminal such as a server or a tablet. The printer engine 111 is configured to form (print) an image on a recording material such as paper under the control of the CPU 101 based on the image data received via the system bus 110. The printer engine 111 includes the fixing unit 17 for heating the toner image transferred on the recording material, thereby thermally fixing the toner image on the recording material. The fixing unit 17 includes the fixing heater 30 for heating the recording material and the temperature of the fixing heater 30 in fixing the toner image on the recording material (fixing temperature) is controlled by the CPU 101.

<Example Functional Configuration of Image Forming Apparatus>

Figure 3:
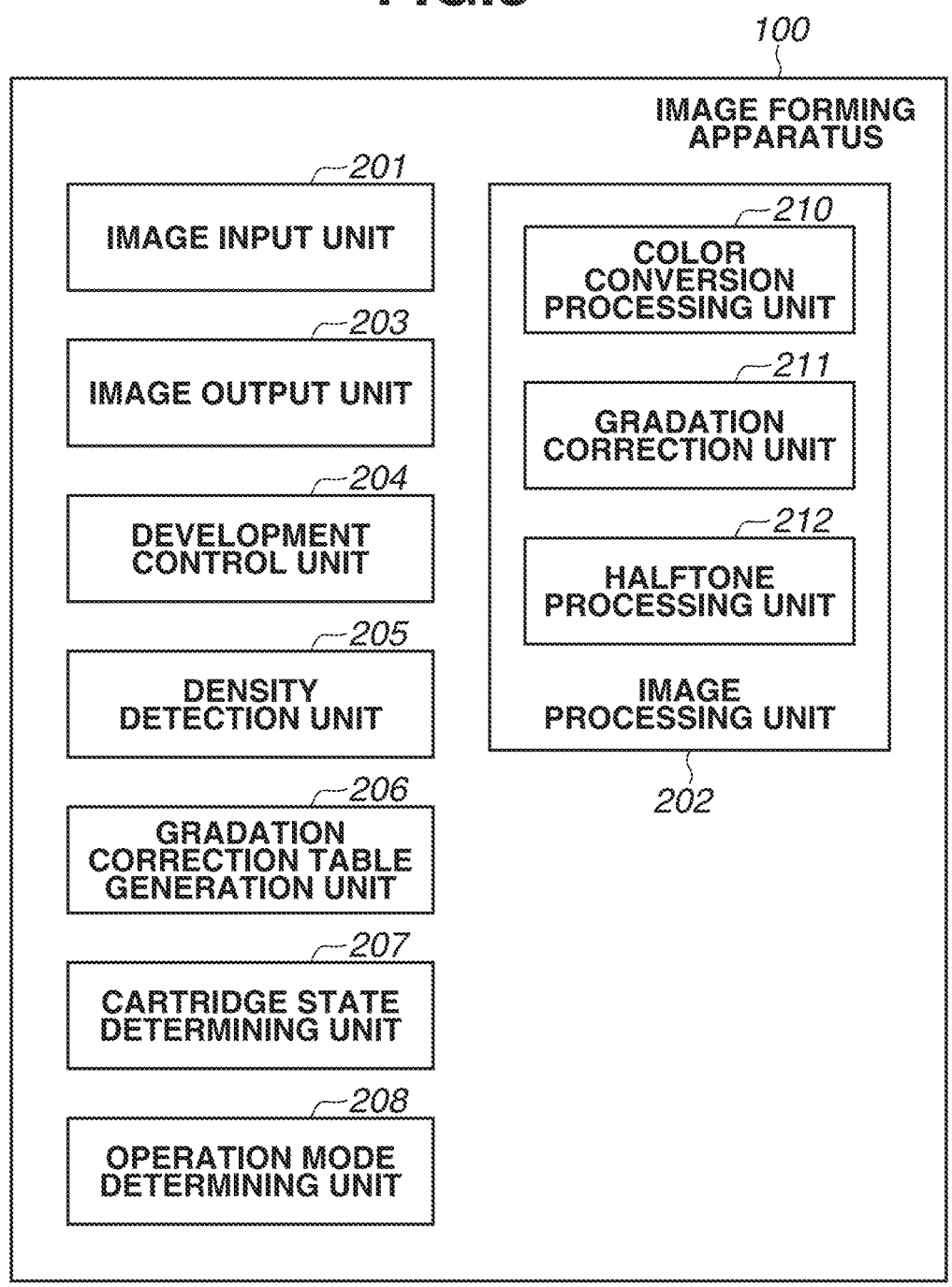
FIG. 3 is a view illustrating a functional configuration of the image forming apparatus according to the example embodiment.

FIG. 3 is a block diagram illustrating a functional configuration of the image forming apparatus 100 according to the first example embodiment. The image forming apparatus 100 includes an image input unit 201, an image processing unit 202, an image output unit 203, a development control unit 204, a density detection unit 205, a gradation correction table generation unit 206, a cartridge state determining unit 207 and an operation mode determining unit 208, as the functional configuration. These functional units are realized on the image forming apparatus 100 by the CPU 101 executing a program(s) read out from the ROM 102 into the RAM 103.

The image input unit 201 is configured to receive an input of image data input to the image forming apparatus 100. The input image data may be, for example, a bit-mapped image. The image input unit 201 stores the image data thus received as the input in the RAM 103 or the external storage device 104.

The image processing unit 202 is configured to execute image processes such as a color conversion process, a gradation correction process, and a halftone process on the input image data. By executing these processes, the image processing unit 202 converts the input image data into image data (print data) corresponding to an image that can be output from the image output unit 203 (an image printable on a recording material). In other words, the image processing unit 202 is configured to generate print data from the input image data.

The image output unit 203 is configured to receive the print data generated by the image processing unit 202, and to transmit the print data as a video signal via the engine I/F 107 to the printer engine 111. Accordingly, the CPU 101 controls the printer engine 111 to form an image on the recording material based on the print data generated by the image processing unit 202. The printer engine 111 is configured to print the image on the recording material by executing an exposure process, a development process, a transfer process, and a fixing process.

The development control unit 204 is configured to determine rotation speeds of the developing rollers 3 and the photosensitive drums 1 as the image bearing members based on an operation mode determined by the operation mode determining unit 208. Accordingly, the CPU 101 controls the printer engine 111 via the engine I/F 107 to form an image on the recording material based on the print data generated by the image processing unit 202.

The density detection unit 205 is configured to receive a setting set by a user from the display unit 105, and to select one of gradation pattern images stored in the external storage device 104 or the ROM 102. The CPU 101 causes the image processing unit 202 to perform image processing of the selected gradation pattern image, and sends print data thus prepared to the image output unit 203. Then, the CPU 101 controls the printer engine 111 based on the mode determined by the operation mode determining unit 208, causes the density sensor 62 to detect the density of the gradation pattern image developed on the intermediate transfer belt 8, and store a detection result in the external storage device 104 or the RAM 103.

The gradation correction table generation unit 206 is configured to receive a setting set by a user from the display unit 105 and generate, based on the setting, a gradation correction table on the basis of the detection result stored in the external storage device 104 or the RAM 103, and store the gradation correction table in the external storage device 104 or the RAM 103.

The cartridge state determining unit 207 is configured to determine whether or not a possibility that the process cartridges 5 would cause a certain image defect in performing the high-chroma printing has reached a predetermined level, via the engine I/F 107 and the printer engine 111, based on remaining lives of the process cartridges 5.

The operation mode determining unit 208 is configured to receive the setting set by the user from the display unit 105, and determine the operation mode based on the setting. More specifically, the operation mode determining unit 208 is configured to determine whether to perform printing in a normal mode or the high-chroma mode. Furthermore, in a case where the operation mode determining unit 208 determines that printing is to be performed in the high-chroma mode, the operation mode determining unit 208 is configured to determine whether to perform printing in a high-chroma standard mode or in a high-chroma avoiding mode described below.

<Image Processing by the Example Image Processing Unit>

As illustrated in FIG. 3, the image processing unit 202 includes a color conversion processing unit 210, a gradation correction unit 211, and a halftone processing unit 212.

The color conversion processing unit 210 is configured to convert input image data into data processible by the printer engine 111, based on a color conversion-use three-dimensional look-up table (LUT) corresponding to the operation mode determined by the operation mode determining unit 208. For example, if the input image data is RGB data and the image forming apparatus 100 is a general multicolor printer using CMYK toners, the color conversion processing unit 210 applies a process to convert RGB data into CMYK data to the input image data. The color conversion-use three-dimensional LUT, to which the color conversion processing unit 210 refers, includes different three-dimensional LUTs including the normal mode, the high-chroma standard mode, and the high-chroma avoiding mode to be determined by the operation mode determining unit 208.

The gradation correction unit 211 is configured to convert the input image data into data processible by the printer engine 111, on the basis of the gradation correction table generated by the gradation correction table generation unit 206. For example, in a case where the input image data is CMYK data and the image forming apparatus 100 is a general multicolor printer using CMYK toners, the gradation correction unit 211 performs the gradation correction process by applying the gradation correction table to each of cyan, magenta, yellow, and black. The gradation correction table applied by the gradation correction unit 211 includes different gradation correction tables the normal mode, the high-chroma standard mode, or the high-chroma avoiding mode to be determined by the operation mode determining unit 208.

The halftone processing unit 212 is configured to perform the halftone process on the data converted into the CMYK data by the color conversion processing unit 210 and the gradation correction unit 211. In many cases, the printer engine 111 is configured to be capable of outputting only an image with a small number of gradations such as 2, 4, or 16 gradations. For this reason, the halftone processing unit 212 performs the halftone process such that halftone can be stably expressed even when an image with such a small number of gradations is to be output. As the halftone process of the halftone processing unit 212, various methods such as a density pattern method, a systematic dither method, and an error diffusion method are applicable.

<Example Printer Engine Configuration of the Image Forming Apparatus>

Figure 4:
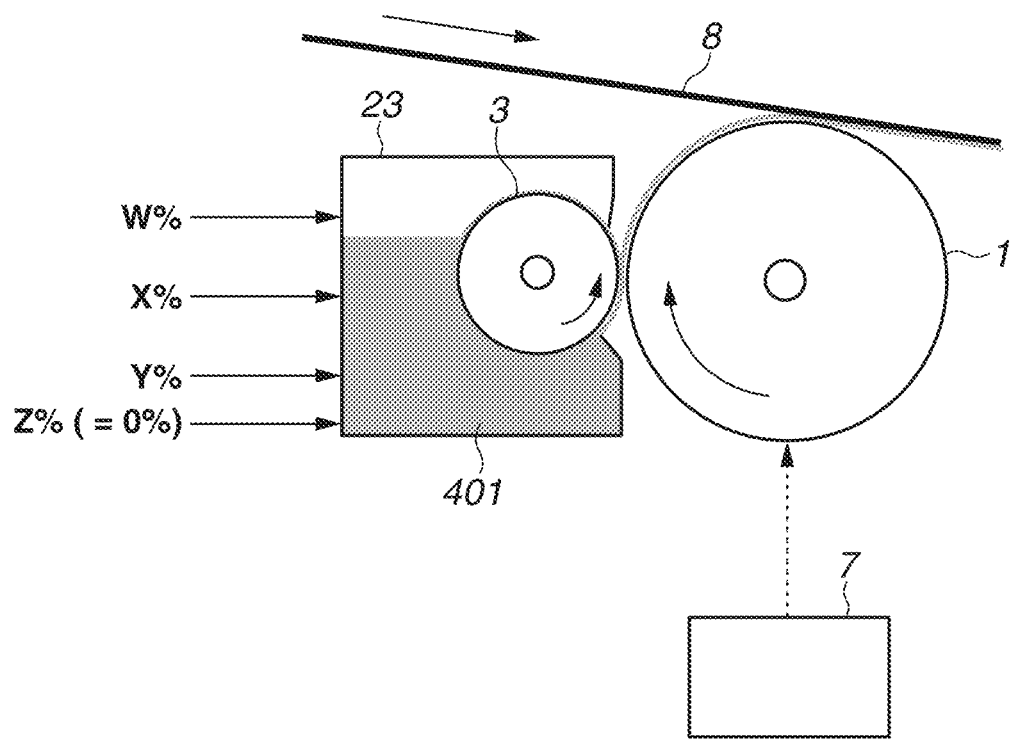
FIG. 4 is a view illustrating a partial configuration of a printer engine according to the example embodiment.

As illustrated in FIG. 4, the process cartridges 5 are detachably attached to the printer engine 111. The photosensitive drum 1 is configured to be subjected to image exposure by the exposure device 7 and form thereon an electrostatic latent image. The developing units are configured such that toner 401 is thinly applied to the developing rollers 3, and the developing rollers 3 with a thin film of the toner 401 thereon develop the electrostatic latent images formed on the photosensitive drums 1 thereby to form toner images on the intermediate transfer belt 8. The toner images are transferred from the photosensitive drums 1 onto the recording sheet via the intermediate transfer belt 8, so that the image is formed on the recording sheet. The CPU 101 is configured to receive a setting by the user from the display unit 105, and control the rotation speeds (circumferential velocities) of the developing rollers 3 and/or the photosensitive drums 1 based on the setting. For example, when the high-chroma printing is to be performed, a greater amount of toner is supplied from the developing rollers 3 onto the photosensitive drum 1 than when the normal printing is to be performed, so that the chroma is increased. The rotation speed of the photosensitive drums 1 in the high-chroma printing is reduced compared with that in the normal printing in such a way that the rotation speed of the photosensitive drums 1 is changed to ⅓ of the rotation speed of the photosensitive drums 1 in the normal printing while the rotation speed of the developing rollers 3 remains unchanged. This is because a speed of passing the sheet in the fixing unit for fixing the toner onto the sheet by thermally melting the toner and pressing the toner onto the sheet is determined to be a speed that ensures stable fixing of the toner onto the sheet. This speed for fixing determines the rotation speed of the photosensitive drums 1. A greater amount of toner than usual is supplied onto the photosensitive drums 1 by increasing a rotation speed ratio of the developing rollers 3 with respect to the photosensitive drums 1 as described above. However, in general, both of the rotation speeds of the photosensitive drums 1 and the developing rollers 3 are determined to maximize a printing speed. Accordingly, in a case where the output type "high-chroma" is selected, the circumferential velocity ratio is adjusted by reducing the rotation speed of the photosensitive drums 1 while keeping the rotation speed of the developing rollers 3. In a general multicolor printer using CMYK toners, one combination of the developing roller 3 and the photosensitive drum 1 is provided for each toner, that is, four combinations of the developing rollers 3 and the photosensitive drums 1 are provided.

As one example of detecting a remaining toner amount in the process cartridge 5, remaining toner amounts of W %, X %, Y %, and Z % (0%) are detectable by a remaining toner amount sensor (not illustrated). The remaining toner amount in the process cartridge 5 is detected based on remaining toner amount detection information obtained by the remaining toner amount sensor (not illustrated) and information of video counting in which output data is counted by the engine I/F every time the printer engine 111 performs printing. More specifically, a change in the remaining toner amount is determined in such a way that W %, X %, Y %, and Z % are detected by the remaining toner amount sensor, and the video counting compensates information about the toner remaining amount between these percentages.

<Example Printing Process>

Figure 5:
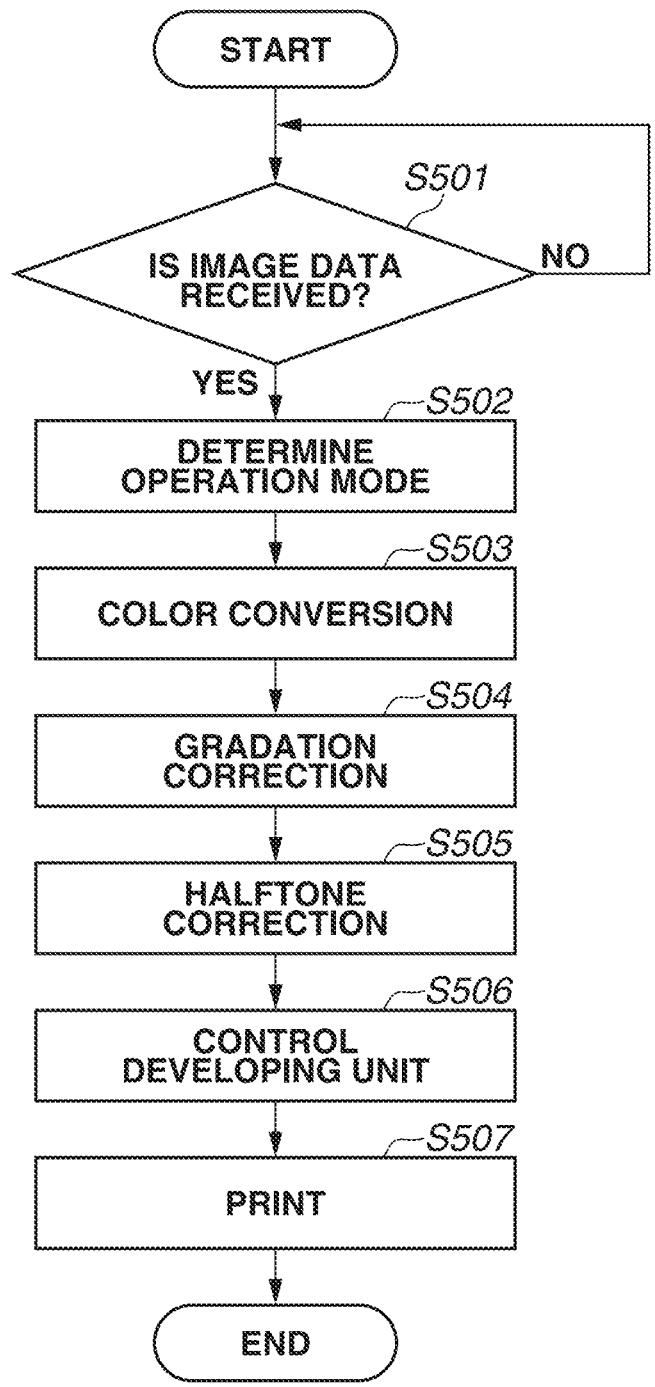
FIG. 5 is a flow chart illustrating an image processing procedure for printing according to the example embodiment.

FIG. 5 is a flow chart illustrating one example of a procedure from a time when the image input unit 201 receives the image data to a time when the image output unit 203 outputs the image data in an appropriate operation mode. The process of each step in the flow chart of FIG. 5 is realized on the image forming apparatus 100 by the CPU 101 reading out a program(s) from the ROM 102 to the RAM 103 and executing the program(s).

In step S501, the image input unit 201 waits for input of the image data, and when image input unit 201 receives the input of the image data (YES in step S501), the procedure proceeds to step S502. Here, it is assumed that the image data thus input is RGB data whose R, G, and B data are all 8 bits. The description herein explains a case where the input colors are colors in the RGB color space but output colors are colors in the CMYK color space, but the colors are not limited to this case, and the input colors and the output colors may be one or more colors.

In step S502, the operation mode determining unit 208 determines whether the operation mode is the normal mode, the high-chroma standard mode, or the high-chroma avoiding mode, based on the input image data or on the setting of the image forming apparatus 100. After that, the procedure proceeds to step S503. In step S503, the color conversion processing unit 210 performs the color conversion on the input data based on the color conversion table corresponding to the operation mode thus determined in step S502. After that, the procedure proceeds to step S504.

FIGS. 6A to 6C illustrate one example of the color conversion table to be used in step S503. FIG. 6A illustrates one example of a three-dimensional LUT in which the input colors are colors in the RGB color space and the output colors are colors in the CMYK color space when the colors are adjusted to appropriately output an image in the normal mode, and this three-dimensional LUT is stored in the ROM 102 in advance. FIG. 6B illustrates one example of a three-dimensional LUT in which the input colors are colors in the RGB color space and the output colors are colors in the CMYK color space when the colors are adjusted to appropriately output an image in the high-chroma standard mode, and this three-dimensional LUT is stored in the ROM 102 in advance. FIG. 6C illustrates one example of a three-dimensional LUT in which the input colors are colors in the RGB color space and the output colors are colors in the CMYK color space when the colors are adjusted to appropriately output an image in the high-chroma avoiding mode, and this three-dimensional LUT is stored in the ROM 102 in advance.

In step S504, the gradation correction unit 211 performs the gradation correction process corresponding to the operation mode thus determined in step S502 on the image data on which the color conversion has been performed. After that, the procedure proceeds to step S505. In step S505, the halftone processing unit 212 performs the halftone process on the image data on which the gradation correction has been performed. After that, the procedure proceeds to step S506. In step S506, the development control unit 204 controls the rotation speeds of the developing rollers 3 and/or the photosensitive drums 1 based on the operation mode thus determined in step S502. After that, in step S507, the image output unit 203 sends the image data on which the halftone process has been performed to the printer engine 111 via the engine I/F 107, and the printer engine 111 prints out the image data. Then, the process ends.

The processes illustrated in FIG. 5 generate an output image in which bright pixel portions or low chroma portions contained in the input image data to be processed are unchanged and constant regardless of the operation modes. On the other hand, dark portions or high-chroma portions of the input image data are higher in chroma and density in the output image in the high-chroma mode than in the normal mode.

<Gradation Correction Table Generation>

FIG. 7 is a flow chart illustrating one example of a procedure from a time when the CPU performs the gradation correction to a time when the gradation correction table is generated. The processes illustrated in FIG. 7 are performed by the CPU 101 reading out a program(s) from the ROM 102 to the RAM 103 and executing the program(s), and performed when an instruction to perform the gradation correction is issued by the operation of the operation unit 106 by the user. The processes in FIG. 7 assume that a gradation correction table to be a standard (hereinafter, referred to as "standard gradation correction table") is stored in ROM 102 in advance.

In step S701, the procedure waits until the instruction to perform the gradation correction is issued by a user via the operation unit 106. Then, when the instruction is issued (YES in step S701), the procedure proceeds to step S702.

In step S702, the operation mode determining unit 208 determines whether the operation mode for the gradation correction is the normal mode, the high-chroma standard mode, or the high-chroma avoiding mode, based on the type of gradation correction requested in step S701 or on the setting of the image forming apparatus 100. After that, the procedure proceeds to step S703.

In step S703, the CPU 101 reads out gradation patch image information for the normal mode or gradation patch image information for the high-chroma modes from the ROM 102 in which the gradation patch image information is stored in advance, depending on the operation mode thus determined in step S702, and sends the gradation patch image information thus read out to the image input unit 201. After that, the CPU 101 sets a standard gradation correction table for normal mode or a standard gradation correction table for high-chroma modes prepared in advance and read out from the ROM 102, to the gradation correction unit 211. The gradation correction unit 211 performs the gradation correction on the gradation patch image information based on the standard gradation correction table. The CPU 101 causes the halftone processing unit 212 to perform the halftone process on the gradation patch image information on which the gradation correction has been performed, and to send the gradation patch image information to the image output unit 203. The CPU 101 causes the development control unit 204 to control the developing rollers 3 and the photosensitive drums 1 depending on the operation mode thus determined in step S702. The CPU 101 causes the image output unit 203 to send the gradation patch image information on which the halftone process has been performed to the printer engine 111 via the engine I/F 107, and the printer engine 111 forms the gradation patch image on the intermediate transfer belt 8.

In step S704, the CPU 101 controls the density sensor 62 via the engine I/F 107 to read a sensor value of the gradation patch image thus formed on the intermediate transfer belt 8. After that, the CPU 101 calculates a density value from the sensor value according to a sensor value density conversion table (not illustrated). After that, the procedure proceeds to step S705.

In step S705, the CPU 101 causes the gradation correction table generation unit 206 to generate a gradation correction table for the normal mode or the high-chroma modes depending on the operation mode thus determined in step S502, and the procedure ends. More specifically, the gradation correction table generation unit 206 generates a signal value correction table for working out an expected density on the basis of a table regarding signal values of the patch image and ideal density values and a table regarding signal values and the measured density values of the patch image calculated in step S704. These tables are generated for the normal mode and for the high-chroma modes for each color.

<Image Defect Measures in the Present Example Embodiment>

FIG. 8 is a flow chart of a procedure for suppressing a particular image defect that would possibly occur only in the high-chroma printing. The process of FIG. 8 is performed by the CPU 101 reading out a program(s) from the ROM 102 into the RAM 103, and executing the program(s).

In step S801, the procedure waits until the high-chroma printing is performed. Then, when the high-chroma printing is performed (YES in step S801), the procedure proceeds to step S802. In step S802, the CPU 101 causes the cartridge state determining unit 207 to determine whether or not the process cartridge 5 has gone into a state where there is a possibility that the particular image defect that would possibly occur only in the high-chroma printing would occur. As a concreate example, this determination is realized by determining whether or not the remaining toner amount illustrated in FIG. 4 having been greater than a threshold becomes equal to or less than the threshold. If the process cartridge 5 has gone into the state where there is a possibility of the occurrence of the image defect (YES in step S802), the procedure proceeds to step S803. In step S803, the CPU 101 changes the charging bias to be applied onto the charging rollers 2 and the development bias to be applied onto the developing rollers 3 from those biases for the high-chroma standard mode to those biases for the high-chroma avoiding mode. More specifically, the development bias is reduced to be smaller than the development bias for the high-chroma standard mode (bias change), so that the image defect caused by toner retention between the photosensitive drums 1 and the developing rollers 3 can be suppressed, the toner retention being attributable to toner deterioration over time due to the expiring or expired toner cartridge. After the bias change, in step S804, image parameters for the high-chroma printing are switched over. More specifically, the color conversion table for the high-chroma standard mode described with reference to FIG. 6B is switched to the color conversion table for high-chroma avoiding mode described above with reference to FIG. 6C. After that, in step S805, the CPU 101 performs the gradation correction for high-chroma printing in the high-chroma avoiding mode.

According to the present example embodiment, the determination of the cartridge state determining unit is performed based on the remaining toner amount, but the determination may be based on remaining lives of the developing units, remaining lives of the photosensitive drums, or remaining lives of the toner cartridges. The remaining lives of the developing units are remaining periods of usage of the developing units or the number of sheets printable with the developing units, and the remaining lives of the photosensitive drums are remaining periods of usage of the photosensitive drums or the number of sheets printable with the photosensitive drums.

According to the present example embodiment, the cartridge state determination is performed when printing is performed, but the cartridge state determination may be performed when the image forming apparatus is started up or recovering from a sleep mode.

According to the present example embodiment, the gradation correction for the high-chroma printing is performed when the cartridge state determination is performed, but the cartridge state determination may be performed together with the gradation correction for the normal printing.

In the first example embodiment, the high-chroma mode switching in printing is described. In a second example embodiment, high-chroma mode switching in replacing a process cartridge 5 will be described.

FIG. 9 is a flow chart regarding a procedure for suppressing a particular image defect that would possibly occur only in the high-chroma printing, the procedure being performed in replacing a process cartridge 5. The process in FIG. 9 is performed by the CPU 101 reading out a program(s) from the ROM 102 into the RAM 103, and executing the program(s).

In step S901, the procedure waits until a process cartridge 5 is replaced. Then, when the process cartridge 5 is replaced (YES in step S901), the procedure proceeds to step S902. In step S902, the CPU 101 causes the cartridge state determining unit 207 to determine whether or not any of the process cartridges 5 of four colors has reached a state where there is a possibility that the particular image defect would possibly occur in the high-chroma printing. If any of the process cartridges 5 of four colors has reached the state (YES in step S902), the procedure proceeds to step S903. In step S903, the CPU 101 changes the charging bias to be applied on the charging rollers 2 and the development bias to be applied on the developing rollers 3.

If the state of the process cartridge 5 is changed from the state where any of the process cartridges 5 of four colors has reached the state with a possibility of the occurrence of the particular image defect to the state where any of the process cartridges 5 of four colors has not reached the state with a possibility of the occurrence of the particular image defect, these biases are changed back from those biases for the high-chroma avoiding mode to those biases for the high-chroma standard mode. More specifically, the biases are increased. If the state of the process cartridge 5 is changed to the state where any of the process cartridges 5 of four colors has reached the state with a possibility of the occurrence of the particular image defect from the state where any of the process cartridges 5 of four colors has not reached the state with a possibility of the occurrence of the particular image defect, these biases are changed from those biases for the high-chroma standard mode to those biases for the high-chroma avoiding mode. More specifically, the biases are reduced.

In step S904, the CPU 101 performs both of the gradation correction for the normal printing and the gradation correction for the high-chroma printing.

According to the example embodiments, it becomes possible to suppress the image defect caused by the toner retention between the image bearing members and the developing units in the printing mode in which the rotation speed of the developing units is faster than the rotation speed of the image bearing members, thereby making it possible to provide high-chroma printing with stable quality.

Other Example Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-036847, filed Feb. 28, 2019, which is hereby incorporated by reference herein in its entirety.

What is claimed is:

1. An image forming apparatus configured to record an image by forming an electrostatic latent image on an image bearing member, developing the electrostatic latent image by attaching toner onto the image bearing member by using a developing unit so as to form a toner image, and transferring the toner image onto a recording sheet from the image bearing member, the image forming apparatus comprising:
   a setting unit configured to set a mode in which a rotation speed of the developing unit is faster than a rotation speed of the image bearing member to increase an amount of toner to be supplied to the image bearing member;
   a determining unit configured to determine whether or not a remaining amount of toner is equal to or less than a threshold in the mode set by the setting unit; and
   a bias changing unit configured to reduce a development bias to be applied onto the developing unit, in a case where the determining unit determines that the remaining amount of the toner is equal to or less than the threshold.

2. The image forming apparatus according to claim 1, further comprising a correction unit configured to correct gradation after the development bias is changed by the bias changing unit.

3. The image forming apparatus according to claim 1, further comprising a switching unit configured to switch a color conversion coefficient based on the development bias changed by the bias changing unit.

4. An image forming apparatus configured to record an image by forming an electrostatic latent image on an image bearing member, developing the electrostatic latent image by attaching toner onto the image bearing member by using a developing unit so as to form a toner image, and transferring the toner image onto a recording sheet from the image bearing member, the image forming apparatus comprising:
- a setting unit configured to set a mode in which a rotation speed of the developing unit is faster than a rotation speed of the image bearing member to increase an amount of toner to be supplied to the image bearing member;
- a determining unit configured to determine a remaining life of the developing unit or a remaining life of the image bearing member in the mode set by the setting unit; and
- a bias changing unit configured to reduce a development bias to be applied onto the developing unit based on a result of determination by the determining unit.

5. The image forming apparatus according to claim 4, wherein the remaining life of the developing unit is a remaining period of usage of the developing unit or a number of sheets printable with the developing unit.

6. The image forming apparatus according to claim 4, wherein the remaining life of the image bearing member is a remaining period of usage of the image bearing member or a number of sheets printable with the image bearing member.

7. An image forming method for an image forming apparatus configured to record an image by forming an electrostatic latent image on an image bearing member, developing the electrostatic latent image by attaching toner onto the image bearing member by using a developing unit so as to form a toner image, and transferring the toner image onto a recording sheet from the image bearing member, the image forming method comprising:
- setting a mode in which a rotation speed of the developing unit is faster than a rotation speed of the image bearing member to increase an amount of toner to be supplied to the image bearing member;
- determining whether or not a remaining amount of toner is equal to or less than a threshold in the mode set in the setting; and
- reducing a development bias to be applied onto the developing unit in a case where it is determined in the determining that the remaining amount of the toner is equal to or less than the threshold.

8. An image forming method for an image forming apparatus configured to record an image by forming an electrostatic latent image on an image bearing member, developing the electrostatic latent image by attaching toner onto the image bearing member by using a developing unit so as to form a toner image, and transferring the toner image onto a recording sheet from the image bearing member, the image forming method comprising:
- setting a mode in which a rotation speed of the developing unit is faster than a rotation speed of the image bearing member to increase an amount of toner to be supplied to the image bearing member;
- determining a remaining life of the developing unit or a remaining life of the image bearing member in the mode set in the setting; and
- reducing a development bias to be applied onto the developing unit based on a result of determination in the determining.

* * * * *